United States Patent [19]

Schardt

[11] 4,430,749

[45] Feb. 7, 1984

[54] MEDICAL IMAGING APPARATUS AND METHOD FOR FURNISHING DIFFERENCE IMAGES

[75] Inventor: Mark A. Schardt, Schaumburg, Ill.

[73] Assignee: Siemens Gammasonics, Inc., Des Plaines, Ill.

[21] Appl. No.: 280,055

[22] Filed: Jun. 30, 1981

[51] Int. Cl.³ .......................... H04N 5/32; G06F 15/42
[52] U.S. Cl. .................................... 382/54; 358/105; 364/414; 382/6
[58] Field of Search .................... 364/414, 415; 382/6, 382/54; 358/93, 111, 105; 378/901

[56] References Cited

U.S. PATENT DOCUMENTS

| | | | |
|---|---|---|---|
| 3,894,181 | 7/1975 | Mistretta et al. | 358/111 |
| 4,002,910 | 1/1977 | LeMay | 364/414 |
| 4,217,641 | 8/1980 | Naparstek | 364/414 |
| 4,323,973 | 4/1982 | Greenfield | 364/415 |
| 4,335,427 | 6/1982 | Hunt et al. | 382/6 |
| 4,355,331 | 10/1982 | Georges et al. | 358/111 |

FOREIGN PATENT DOCUMENTS 495917  4/1977  Australia ............................ 364/414

*Primary Examiner*—Errol A. Krass
*Attorney, Agent, or Firm*—Karl F. Milde, Jr.

[57] ABSTRACT

The method and apparatus furnish difference images from a video signal which contains a sequence of images that are obtained from a patient under examination. First a first of the images contained in the video signal is recorded in a first storage device. Thereby a so-called primary mask is formed. Then, a subsequent second of the images contained in the video signal is recorded in a second storage device. Subsequently, a third of these images is recorded in a third storage device. From here on, images contained in the video signal following the third image are recorded alternatingly in the second and the third storage device. At a certain point of time, a signal for starting data acquisition is provided. Simultaneously or thereafter, a so-called secondary mask is selected. The secondary mask is an image completely recorded in the second or third storage device shortly prior to the generation of the data acquisition signal. This secondary mask is subtracted from those images contained in the video signal which appear after the data acquisition signal has been generated. Thereby the afore-mentioned difference images are formed for display.

11 Claims, 9 Drawing Figures

| INPUT IMAGE NUMBER | | IMAGE MEMORY DESTINATION | |
|---|---|---|---|
| 1 PRIMARY MASK | | A1 | |
| N IMAGES { 2 | ——————————— | A21 | } TEMPORARY |
| 3 | ——————————— | A22 | } FIRST SET |
| 4 | ——————————— | A23 | |
| 5 | ——————————— | A24 | |
| N IMAGES { 6 | ——————————— | A31 | |
| 7 | ——————————— | A32 | } SECOND SET |
| 8 | ——————————— | A33 | |
| 9 | ——————————— | A34 | |
| 10 | ——————————— | A21 | } PORTION OF FIRST SET |
| 11 | ——————————— | A22 | |
| 12 START STUDY | ——————————— | B1 | |
| 13 | ——————————— | B2 | |

FIG. 5

MEDICAL IMAGING APPARATUS AND METHOD FOR FURNISHING DIFFERENCE IMAGES

CROSS REFERENCE TO RELATED APPLICATIONS

This invention relates to the same technical field as the two commonly owned patent applications each entitled "Medical Imaging Apparatus" by Ivan Jazbec and William Anderson, respectively, Ser. Nos. 278,479 and 278,481, both applications filed on June 29, 1981.

BACKGROUND OF THE INVENTION

1. Field of the Invention

This invention relates to a medical imaging apparatus and to a method for furnishing difference images. More particularly, this invention relates to a medical imaging apparatus and method, such apparatus and method having features for reducing the effect of patient motion on difference images. Preferably, this invention relates to a medical X-ray imaging apparatus and method.

2. Description of a Difference Imaging Apparatus and Method

In the commonly-owned co-pending patent application by Ivan Jazbec entitled "Medical Imaging Apparatus", Ser. No. 278,479, there is disclosed a medical imaging apparatus which detects the flow of a contrast medium through an organ of the body under study. Even a small amount of the tracer of contrast medium present in the study organ can be detected. The organ of the patient is exposed to the nuclear radiation of the tracer or to X-rays, respectively. The intensity distribution of the radiation transmitted through the organ is determined by means of a detector such as an image intensifier for X-rays. A TV camera coupled to the image intensifier issues a video signal typically in analog form. This video signal corresponds to a predetermined number of images per second. It may be digitized with respect to the intensity of the individual image elements. Finally it is displayed on a video monitor.

In particular, at least one image is usually taken prior to the injection of the contrast medium into the patient's blood stream. This image forms a reference image and is referred to as "primary mask". It is stored in a first storage device or first memory. In order to carry out the study, difference images are obtained by subtracting the primary mask from subsequent images or frames. The study is begun when the contrast medium enters the area of interest, for instance the aorta of the human heart. The flow of the contrast medium into and through the organ under examination can be observed by displaying the difference images on the display screen. Such a study can be carried out by processing live or recorded images. Thus, a replay feature may be provided. In order to make a replay possible, the images obtained after the start of the study are stored in a second storage device or second memory. From here they can be displayed on the screen (either with or without the subtraction of the primary mask) as often as required.

The disclosure of the aforementioned co-pending patent application of Ivan Jazbec, Ser. No. 278,481, is incorporated herein by reference.

Substantial time may pass between the recording of the primary mask and the appearance of the contrast medium in the difference images. During this time interval it is possible that the patient and/or organ of interest will move. This will result in a shift in the displayed image. The difference images can be degraded by these movements especially within this time interval. It is desirable to minimize or at least reduce the effect of patient motion on the difference images.

SUMMARY OF THE INVENTION

1. Objects

It is an object of this invention to provide a method for furnishing difference images from a video signal which method takes patient movements into consideration.

It is another object of this invention to provide a medical imageing apparatus which has the capability of detecting small changes in image intensity and provides for clear difference images.

It is still another object of this invention to provide a medical imaging apparatus furnishing difference images, which apparatus keeps effects on the difference images due to motions of a patient under examination small.

It is still another object of this invention to provide a medical X-ray imaging apparatus which furnishes difference images of a patient under examination that contain a minimum of artifacts due to motions of the patient.

2. Summary

According to this invention, a method for furnishing difference images is provided. The difference images are derived from a video signal which contains a sequence of images of a patient under examination. This method comprises the following steps:
(a) recording a first image contained in the video signal in a first storage device, thereby forming a primary mask;
(b) recording a subsequent second image contained in the video signal in a second storage device;
(c) recording a subsequent third image contained in the video signal in a third storage device;
(d) recording the images contained in the video signal and following the third image, alternatingly in the second and in the third storage device;
(e) providing a signal for the start of data acquisition;
(f) selecting a secondary mask, the secondary mask being an image completely recorded in the second or third storage device shortly prior to providing the data acquisition signal; and
(g) subtracting the secondary mask from images contained in the video signal which follow the data acquisition signal, thereby forming the difference images.

In other words: in order to eliminate motion artifacts which are introduced in the time period between taking the primary mask and the occurrence of the images of interest (these are the images which follow the data acquisition signal), a secondary mask is automatically taken prior to the start of data acquisition. This secondary mask is used instead of the primary mask for forming the difference images. The secondary mask is an updated version of the primary mask. The primary mask, however, may not completely be disregarded. If necessary, the primary mask can be used for forming the difference images. This is particularly true if the time period was not sufficiently large to complete requirements for generating the secondary mask in the second storage device.

The secondary mask should be taken as close as possible to the first image of interest which is used for forming the first difference image. Thus, the secondary mask is generated just prior to the data acquisition signal, that is prior to the appearance of the contrast medium in the image field or in an area of interest contained therein, or just prior to the start of the study.

The difference images may be displayed live and/or they may be recorded. Instead of recording the difference, the images of interest contained in the video signal may also be recorded in a fourth storage device.

Instead of recording a single image, in each case a summation of images may be recorded. Thus, the primary mask contained in the first storage device may be formed by a summation of a predetermined number of images, and subsequently the images which are recorded alternatingly in the second and thrid storage device may each contain also a predetermined number of images.

The method according to the invention is applicable to images which are recorded in a digital memory. Yet, this method is also applicable to the storage of analog images on a video disk or in a similar analog storage device.

According to this invention, there is also provided a medical apparatus for furnishing difference images. This apparatus contains a radiation detector for providing a video signal which corresponds to a patient under examination. The video signal contains a sequence of consecutive images. The apparatus also contains a first storage device for recording a first of the images of the video signal, which first image forms a primary mask, a second storage device for recording a subsequent second of these images, and a third storage device for recording a subsequent third of these images. The apparatus also contains a device for recording images which follow the third image alternatingly in the second and the third storage device, respectively. There is also provided a device which issues a signal for data acquisition. This signal for data acquisition may be formed automatically by a monitoring circuit or by hand by pressing a push button. It indicates the start of the study, in particular the appearance of the contrast medium in the image, particularly in the area of interest. A subtracting device is used for subtracting a secondary mask from images of the video signal which follow the data acquisition signal. This secondary mask is an image which is recorded in a complete form in the second or third storage device shortly prior to the data acquisition signal. The subtracting device forms the difference images for display or recording by subtracting the secondary mask from the images of interest. The foregoing and other objects, features and advantages of the invention will be apparent from the following more particular description of the preferred embodiments of the invention, as illustrated in the accompanying drawings.

BRIEF DESCRIPTION OF THE DRAWINGS

In the drawings:

FIG. 5 is a chart illustrating the generation of the secondary mask when image summation and three sets of memories are used;

DETAILED DESCRIPTION OF THE PREFERRED EMBODIMENTS

Figure 1:
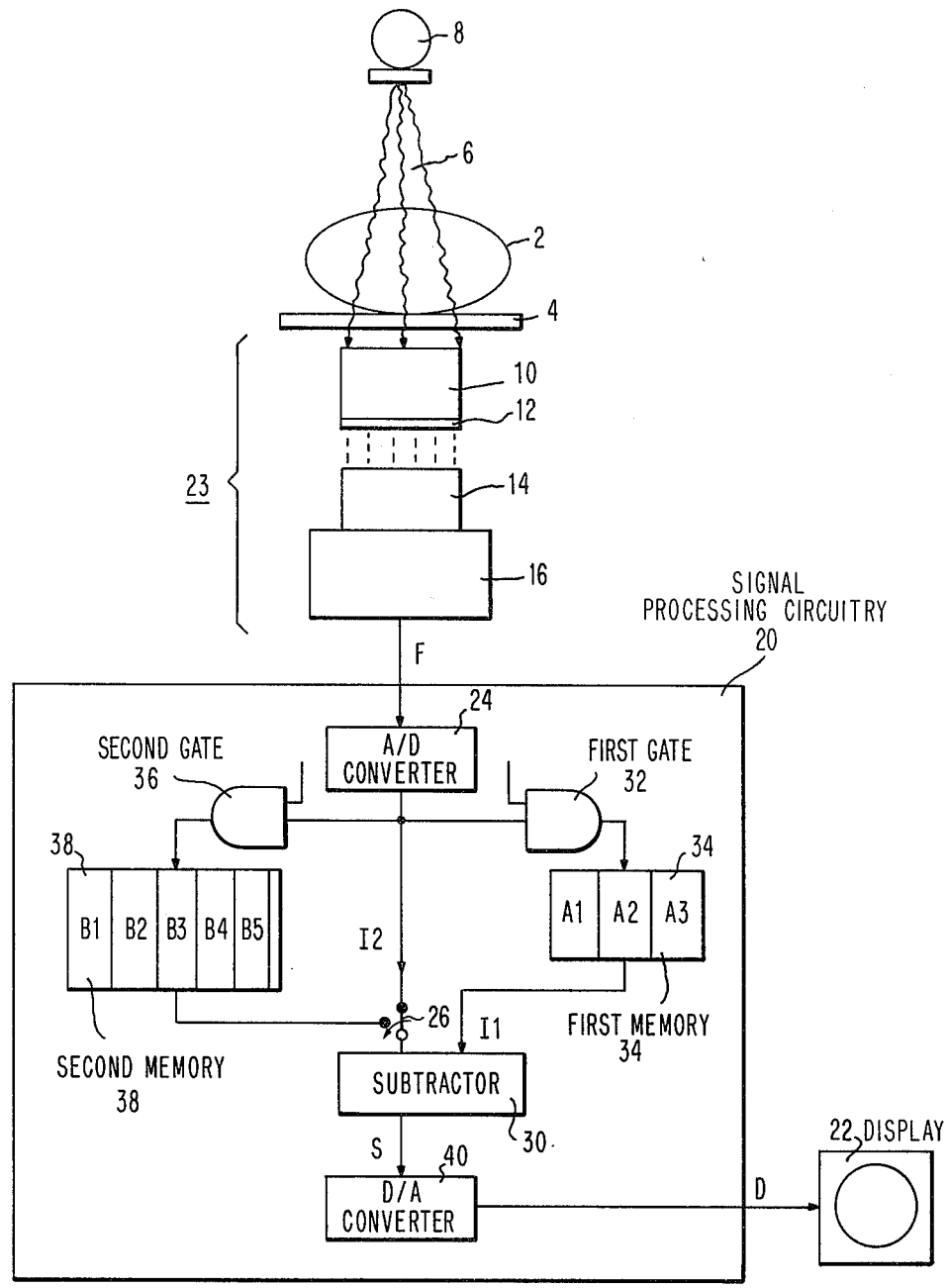
FIG. 1 is a representation of a medical X-ray imaging apparatus according to this invention.

In FIG. 1 a medical imaging apparatus for digital radiography application is illustrated. A patient 2 lies on an examination table 4. The patient 2 is exposed to X-rays 6 which are emitted from an X-ray source 8. X-rays passing through the patient 2 and through the examination table 4 are received by an image intensifier 10 which serve as a detector for determining the transmitted intensity distribution. The image on the visible light screen 12 of the image intensifier 10 is received by the lens system 14 of a vidicon tube which is part of a television camera 16. The television camera 16 forms an analog imaging or a video signal F which is composed of a sequence of individual image signals. This sequence corresponds to a sequence of individual radiation images of the patient 2 under examination. The imaging signal F is fed into a signal processing and evaluation circuitry 20. This circuitry 20 forms a display signal D out of the video or imaging signal F. The display signal D is received by a display device 22 which displays a sequence of images of the patient 2 under examination.

The image intensifier 10 and the television camera 16 may be designed as one unit 23. Such X-ray television system units 23 are commercially available, for instance under the name "VIDEOMED N, Universal X-Ray TV Systems" by Siemens AG, Berlin and Munich, West Germany.

For the following description, it will be assumed that a contrast medium will be applied to the patient 2 and that the position and movement of such contrast medium will be investigated by X-ray imaging and will be displayed on the display device 22.

According to FIG. 1 the analog imaging signal F is applied to an analog-to-digital converter 24. This A-to-D converter 24 converts the intensity information contained in the analog image signal F into digital data. The output signal of the A-to-D converter 24 is referred to as image signal I2. It is applied via a fixed contact of a double throw switch 26 to the first input of a subtractor 30.

The image signal I2 is also transmitted via a first gate 32 to a first digital memory 34. This first memory 34 contains three individual storage locations A1, A2, A3, each of sufficient capacity to store an entire image. The memory 34 issues a reference image signal I1 which may also be termed as "recorded mask". The reference image signal I1 is applied to a second input of the subtractor 30.

The image signal I2 is gated through a second gate 36 to a second digital memory 38. This memory 38 contains a larger number of storage locations B1, B2, B3 . . . , each large enough to store an entire image. The memory 38 serves for storing the so-called images of interest and thus provides a replay feature. It may be a part of the storage device 34. The output of the second memory 38 is connected to another fixed contact of the double-throw switch 26. Thus, either the live image signal I2 from the A-to-D converter 24 or the recorded image signal of interest from the second memory 38 may be applied to the first input of the subtractor 30.

The subtractor 30 subtracts pixel by pixel the intensity of the reference signal I1 from the intensity of the live image signal I2 in the illustrated switch position number 1. It subtracts the reference signal I1 from the recorded image signal of interest in switch position number 2 (not shown). Subtraction is between corresponding pixels. The output signal of the subtractor 30 is transmitted to a digital-to-analog converter 40 which forms analog intensity values and delivers the display signal D to the display device 22.

Figure 2:
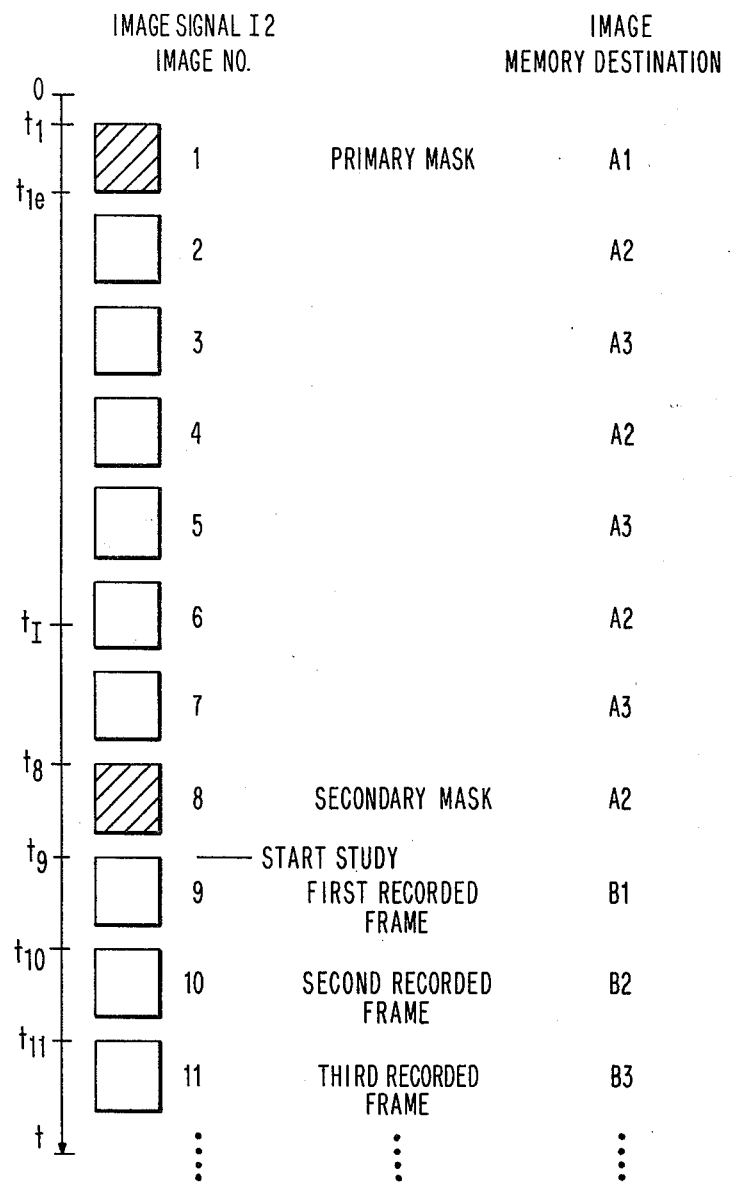
FIG. 2 is a chart illustrating the secondary mask generation when three individual memories are used.

With reference to FIG. 2, the first image or image no. 1 contained in the video signal I2 is recorded in a dedicated or predetermined location of the first digital memory 34. This predetermined location is the storage location A1. Recording starts at a point of time $t_1$. The recorded image no. 1 is the primary mask. It is finished at the point of time $t_{1e}$. The next image, that is image no. 2, is recorded in the second location A2, and the image no. 3 is recorded in the third storage location A3. When this recording is completed, the capacity of the first memory 34 is exhausted. As the subsequent image, that is image number 4 arrives, it is recorded in the second storage location A2, thereby overwriting the contents of this location A2, that is the image no. 2. Similarly, the image no. 5 is recorded in the third storage location A3, thereby overwriting the image no. 3 contained therein. As subsequent images nos. 6, 7, . . . are detected, they are also recorded alternatingly between the two temporary memory locations A2 and A3.

It is assumed that the injection of a contrast medium is performed at a point of time $t_I$ which lies after the start point $t_1$ of recording the primary mask. Conversely, this point of injection $t_I$ may also be located prior to the start $t_1$ of the primary mask.

It is assumed that at a point of time $t_9$ the study is started. This point of time $t_9$ coincides with the occurrence of the image no. 9. At this point of time $t_9$ a data acquisition signal is given. Thus, the point of time $t_9$ characterizes the start of data acquisition.

Preferably this starting point $t_9$ is the point of time of the appearance of the contrast medium in the area of interest displayed on the display device 22.

When the study is started, the last completed image in the temporary memory locations A2 and A3 is identified and selected as a secondary mask. Therefore, in the present example, the secondary mask is the image stored in the second storage location A2. The secondary mask is an updated image with respect to the primary mask, that is motions of the patient in the time period $(t_8 - t_1)$ are disregarded, since the secondary mask and not the primary mask is used for further evaluation.

After the acquisition or start-study signal is given at the point of time $t_9$, the image no. 9 is stored in the first storage location B1 of the second memory 38. The recorded image may also be referred to as the "first recorded frame". Similarly, the subsequent image no. 10 is recorded in the second location B2 to form the "second recorded frame", and the image no. 11 is recorded in the third storage location B3 as the "third recorded frame". When the images nos. 9, 10, 11, . . . are recorded in the memory 38, the double-throw switch 26 is in switch position no. 1, which is illustrated in FIG. 1.

Due to the intensity subtraction pixel by pixel in the subtractor 30, difference images are formed in the output signal S. These difference images make it possible to detect small amounts of contrast medium present in the study organ. After passing the signal S through the D-to-A converter 40, the display signal D is displayed on the display device 22.

Figure 3:
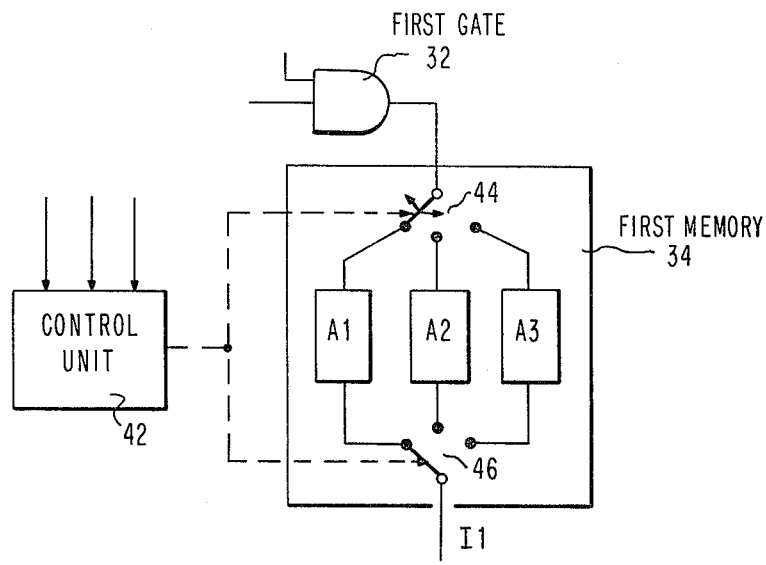
FIG. 3 is a circuit diagram illustrating a storage device containing three memories which are controlled by a control unit in order to form the secondary mask.
Figure 4:
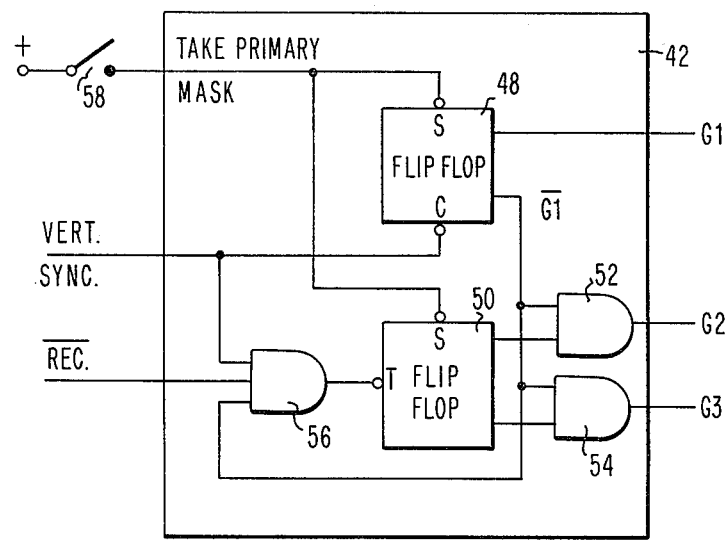
FIG. 4 is a detailed embodiment of a control unit applicable in FIG. 3.

FIGS. 3 and 4 illustrated the first memory 34 and a control unit 42 for controlling this memory: The illustrated circuits 34 and 42 make sure that the secondary mask contained in one of the two storage locations A2, A3 remains frozen-in when images of interest (that is images no. 9, 10, 11, . . . ) are stored in the second memory 38 and subsequently are displayed therefrom.

The first memory 34 contains a first switch 44 for entering the image signal having passed the first gate 32 into a selected one of the storage locations A1, A2, A3. It also contains a second switch 46 for reading the data out of a selected one of the three storage locations A1, A2, A3. The switches 44, 46 are controlled by the control unit 42.

The switches 44, 46 may preferably be realized by gates which are controlled by gating signals G1, G2, and G3, see FIG. 4. The gating signal G1 will bring switches 44, 46 into their first switching position, that is a position in which the input of the location A1 is connected to the first gate 32, and the output of the first location A1 is connected to the subtractor 30, thereby forming the reference signal I1. Similarly, in the second position of the switches 44, 46, the input and the output of the second storage location A2 are connected to the gates 32 and to the subtractor 30, respectively, and in the third switching position the input and the output of the third storage location A3 are connected to the input and output line, respectively, of the first memory 34.

In FIG. 4 details of a control unit 42 for controlling the switches 44 and 46 are illustrated. The control unit 42 contains two flip-flops 48 and 50 and three gates 52, 54, and 56.

When the control unit 42 is started, a push button 58 is activated to obtain a "take-the-primary mask" signal. This signal is applied to the set inputs S of the flip-flops 48 and 50. It will set the first and second flip-flop 48 and 50. Therefore, the output signal G1 will be high so that the switches 44, 46 will assume their first switching position. The signal $\overline{G1}$ which is low will block the gates 52, 54.

Then a signal "Vertical Synchronization" (contained in the image signal F) arrives. This signal is applied to input C in order to clear the first flip-flop 48. The switches 44, 46 will now assume their second switching position due to the signal G2. The signal $\overline{G1}$ delivered from the first flip-flop 48 goes high, thereby enabling the gates 52 and 54. The signal $\overline{G1}$ also enables the third gate 56 to allow "vertical sync" pulses to toggle the toggle input T of the second flip-flop 50. The next VERT. SYNC. pulse will toggle the second flip-flop 50 such that the second gate 54 is enabled thereby issuing the output signal G3 which, in turn, will bring the switches 44, 46 into their third switching position. Subsequent VERT. SYNC. pulses will alternatingly cause the issuance of switching signals G2 and G3.

When the contrast medium reaches the area of interest and the recording of images is started, either automatically or manually by a start signal $\overline{REC.}$, this signal $\overline{REC.}$ freezes the output of, for instance, the second flip-flop 54 by disabling further VERT. SYNC. pulses in the third gate 56 and by subsequently not toggling the toggling input T. It has already been mentioned above that the signals G1, G2 and G3 are applied to the first and to the second switch 44 and 46, respectively. Therefore, during and after recording in the second storage device 38, the second switch 46 is kept in exactly the same position as the first switch 44. This switch position indicates the location A2 or A3 of the last recorded mask, that is the so-called "secondary mask".

In FIG. 5, a modified method for obtaining a secondary mask is illustrated. This method is based on recording images and on summation. Again, the primary mask is recorded in the location A1 of the first memory. As subsequent images are detected, they are recorded alternatingly between a first and a second set of memory locations A21, A22, A23, A24 and A31, A32, A33, A34, respectively. Each of these two sets A2 and A3 contains N=4 storage locations for storing an image. When the study proper is started, the last completed temporary memory set A2 or A3 is identified, and its contents are added up and used as the updated secondary mask. The primary mask is obsolete, if a complete secondary mask has been recorded.

In contrast hereto, the image data may be integrated or summed up directly in each storage location A2 and A3 which are not subdivided. Any given number N of images may be added together (integration) upon arrival to produce an integrated mask. Similarly, the primary mask is also the result of a summation of N images. Integration is achieved by simply adding each image to the contents of the contemplated temporary memory A2 or A3 until N images have been summed. At that point, the other temporary memory A3 or A2, respectively, is erased, and it begins also to accumulate N images. If the temporary memory A3 has successfully recorded N images, the next set of N images is summed into the temporary memory A2, etc.

When the study begins, the last completed sum of N images is identified as the secondary mask. According to FIG. 5, four images have been recorded in the first temporary memory A2, subsequently four images in the second temporary memory A3, and then another two images (images number 10 and 11) in the first temporary memory A2. Thus, the first temporary memory A2 is obviously not complete, and the last complete summation in the second temporary memory A2 is used as the secondary mask. The study is started with the image number 12 which is stored in the first storage location B1 of the second memory.

The number N of images is limited by the bit depth of the memory and then digitized word length of the image. Care must be taken to prevent overflows in the addition process.

Figures 6, 6A:
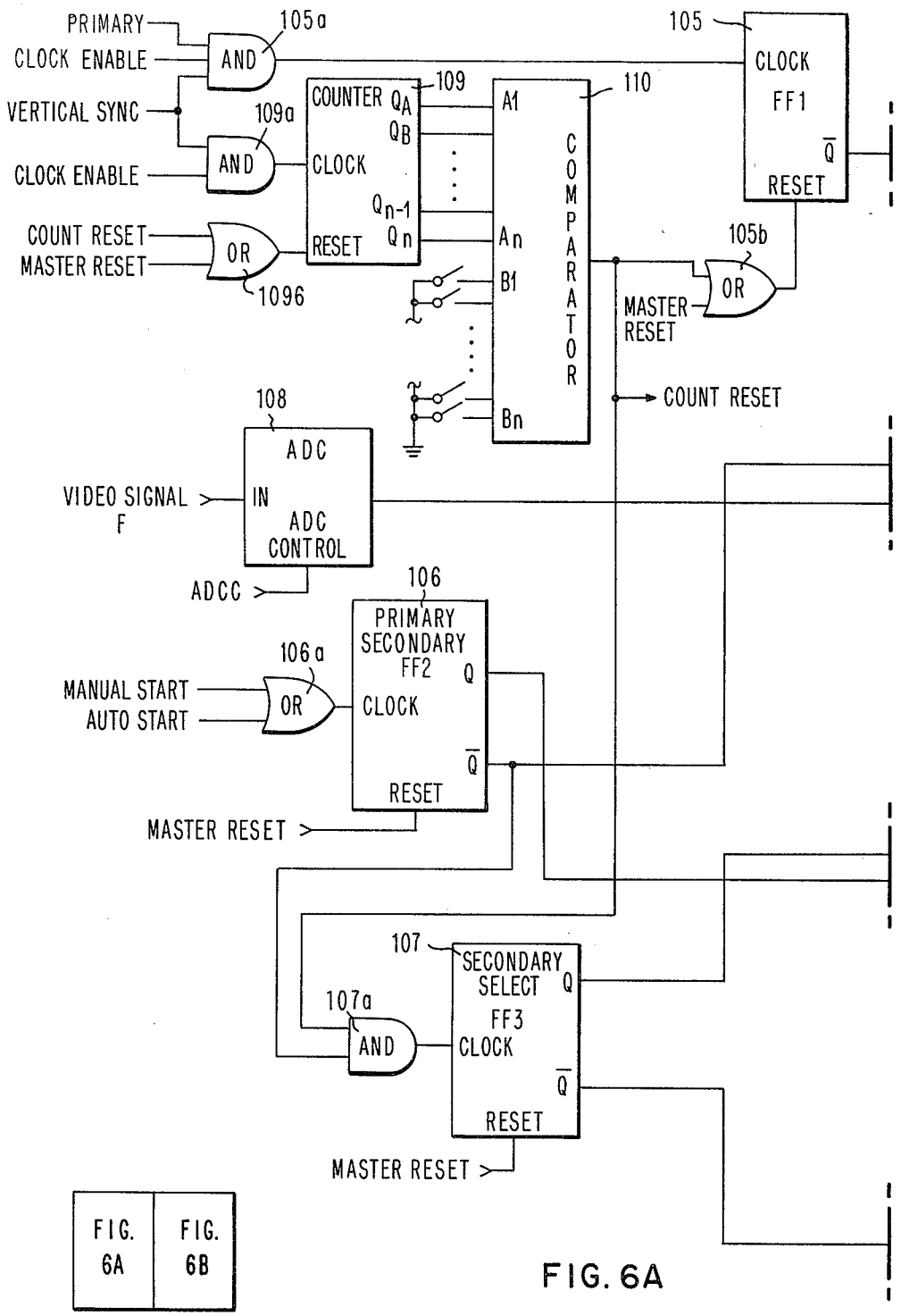
FIG. 6 shows the connection between FIGS. 6A & 6B which, taken together, form a detailed embodiment of a control unit applicable in an automatic secondary mask generation according to FIG. 5.
Figure 6B:
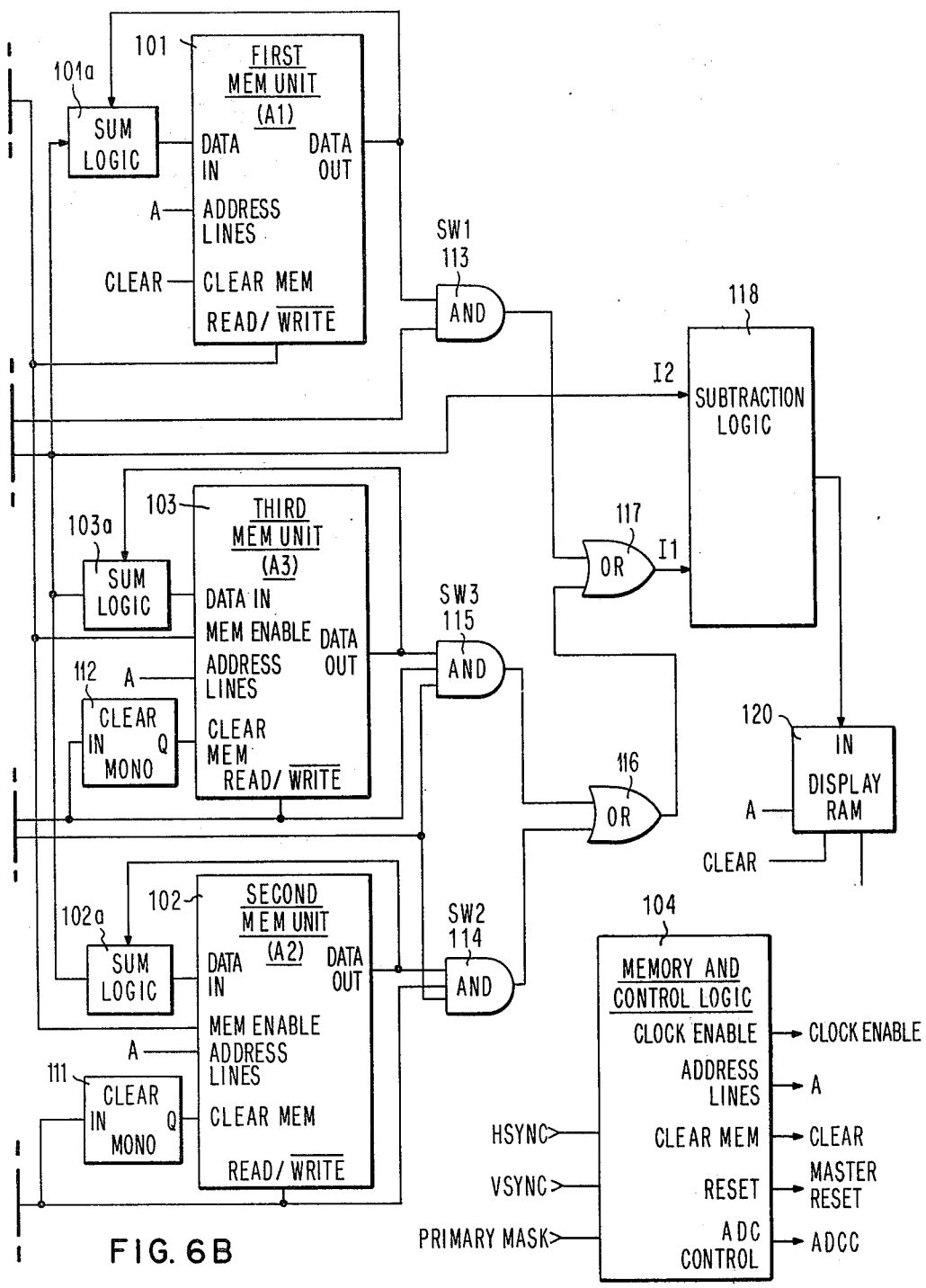
Figure 7:
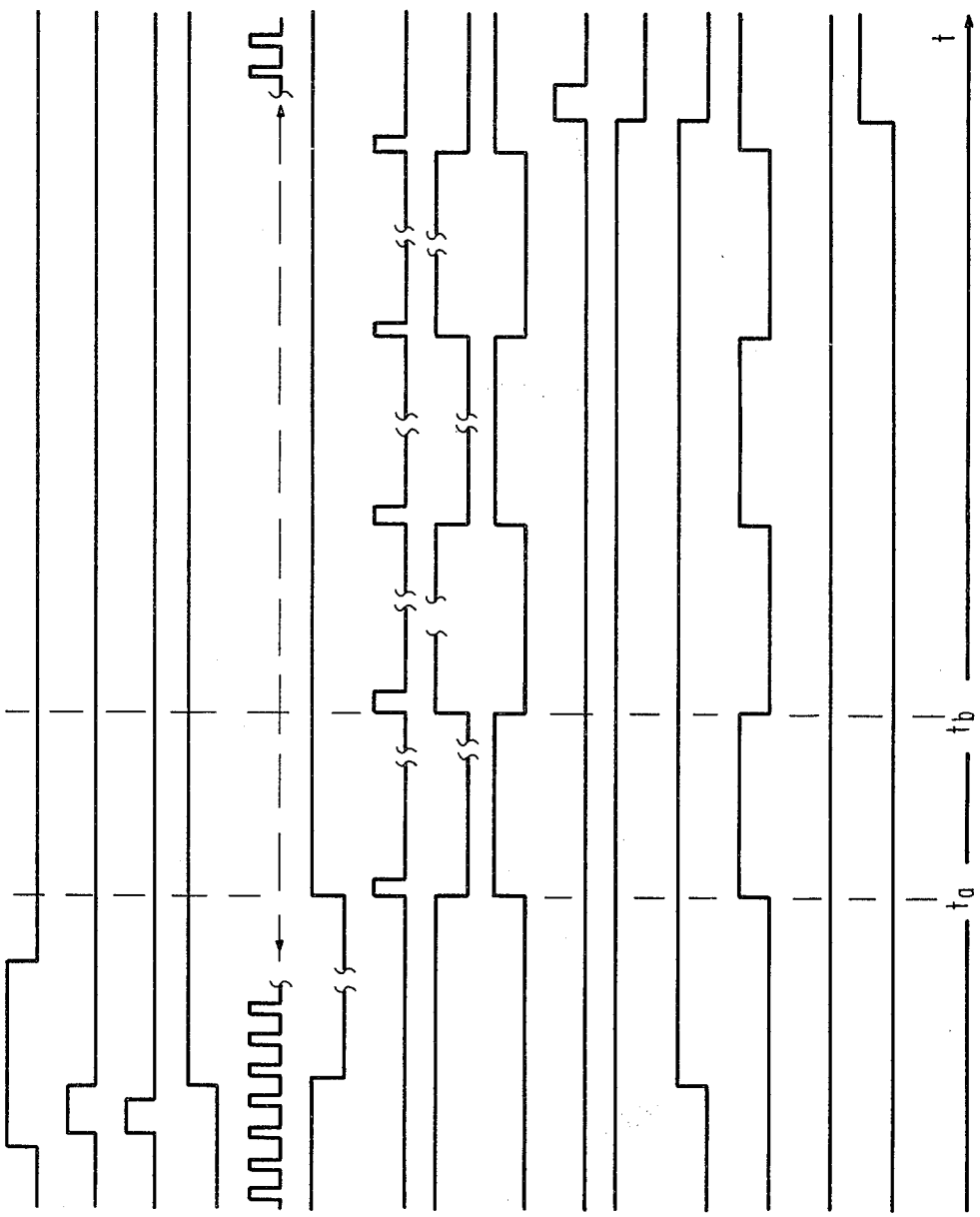
FIG. 7 is a listing of a timing sequence of major signals used in the memories and in the control unit shown in FIG. 6 for performing a method of an automatic secondary mask generation including summation of images.

In FIG. 6 an embodiment of a control unit controlling the automatic secondary mask generation with summation of image signals is illustrated. In FIG. 7 the timing sequence of major signals applied in the control unit of FIG. 6 is shown.

The embodiment illustrated in FIG. 6 is based on the basic design shown in FIG. 3. The first memory 34 contains a first memory unit A1 or 101, a second memory unit A2 or 102, and a thrid memory unit A3 or 103.

In order to form summed-up image signals, each DATA input of the memories 101, 102 and 103 is associated with a sum logic circuit 101a, 102a and 103a, respectively.

The control circuitry for generating the primary and the secondary mask contains a memory and control logic 104, a first flip-flop FF1 or 105, a second flip-flop FF2 or 106 and a third flip-flop FF3 or 107. The clock inputs of these flip-flops 105, 106 and 107 are controlled by an AND gate 105a, an OR gate 106a and an AND gate 107a, respectively. An analog-to-digital converter ADC or 108 corresponding to the A/D converter 24 of FIG. 1, is provided for forming digitized intensity data in the video signal F. The control circuitry also contains a counter 109. The clock input of the counter 109 is controlled by an AND member 109a, and its reset input is controlled by an OR member 109b. The output of the counter 109 is connected to a comparator 110. The output signal of the comparator 110 is applied via an OR member 105b to the reset input of the first flip-flop 105. It is also used as a count reset signal and as one input signal of the AND member 107a. The control circuitry further contains a monostable element 111 for clearing the second memory 102, and another monostable element 112 for clearing the third memory 103. The data outputs of the memory units 101, 102 and 103 are connected to switching elements SW1 or 113, SW2 or 114, and SW3 or 115, respectively. These switching elements or switches 113 through 115 are preferably AND gates.

The outputs of the switching elements 114 and 115 are connected to respective inputs of an OR gate 116, and the outputs of the switching element 113 and of the OR gate 116 are connected to respective inputs of another OR gate 117. The output signal I1 of the OR gate 117 and the output signal I2 of the analog-to-digital converter 108 are applied to a subtraction logic 118. This subtraction logic 118 corresponds to the subtractor 30 in FIG. 1. To the output of the subtraction logic 118 is connected a display RAM 120 which, in turn, controls the display device of the medical imaging apparatus.

According to FIGS. 6 and 7, the operation is started by generating a PRIMARY MASK signal. This signal is applied to the memory and control logic 104 and to the AND gate 105a With the detection of the signal PRIMARY MASK, the memory and control logic 104 generates a signal MASTER RESET, a signal MEMORY CLEAR, and a short time later, a signal CLOCK ENABLE. For generating these signals, the memory and control logic 104 utilizes the horizontal and vertical synchronization signals H SYNC and V SYNC, respectively. These signals are associated with the video signal F. They are utilized to preset the correct address lines A and the control signal ADCC of the analog-to-digital converter 108. The signal MASTER RESET initiates the control circuitry by recessing the first flip-flop 105 (via the OR gate 105b), the primary/secondary output of the second flip-flop 106, the secondary select output of the third flip-flop 107, and the counter 109.

A coincidence between the signal PRIMARY MASK, the signal CLOCK ENABLE, and the signal VERTICAL SYNC at the AND gate 105a toggles the first flip-flop 105. The output signal $\overline{Q}$ of the flip-flop 105 enables the memory units 102 and 103 and allows write access to the first memory unit 101. Thus, the video signal F is digitized by the analog-to-digital converter 108 and is presented to the sum logic 101a of the first memory unit 101.

The coincidence of each VERTICAL SYNC and CLOCK ENABLE signal increments the counter 109. The comparator 110 compares the current counter value with a preselected number n of images to be summed. It issues a true pulse when the prescribed number n of images has been summed into the first memory unit 101. Completion is referred as the PRIMARY MASK.

The output of the comparator 110 resets the first flip-flop 105 and also resets the counter 109. By resetting the first flip-flop 105, the first memory 101 is enabled to read. Additionally, the output of the comparator 110 toggles the output SECONDARY SELECT of the third flip-flop 107, allowing the second memory 102 to accept data from the sum logic 102a. Note that at this point $t_a$ of time that the write function of the second memory unit 102 has been selected, while in the third memory unit 103 the read function has been selected. The functions of these two memory units 102 and 103 are always opposite. Note also that prior to writing, the second memory unit 102 is cleared by the monostable element 111.

Digitized image signals of the video signal F are accumulated into the second memory unit 102 until the prescribed number n of images is detected by the comparator 110. At this point $t_b$ in time, the output of the comparator 110 toggles the output SECONDARY SELECT of the third flip-flop 107, and the third memory unit 103 is now selected to write. The contents of the third memory unit 103 are cleared by the monostable element 112.

When the prerequisite number n of images has been stored in the third memory unit 103, the output of the comparator 110 again toggles the output SECONDARY SELECT of the third flip-flop 107. Thus, data are stored alternatingly between the two memory units 102 and 103.

To the OR gate 106a either a manual start signal MANUAL START or an automatic start signal AUTO START may be applied. When any of these signals is detected, the output PRIMARY/SECONDARY of the second flip-flop is toggled. This disables the first switching element 113. The output signal of the second flip-flop 106 also prohibits any further toggling of the third flip-flop 107. Thus, the read or write functions of the memory units 102 and 103 are "frozen in". The output signal of the second flip-flop 106 also allows the AND gate 114 or the AND gate 115 to become true, depending on the frozen condition of the third flip-flop 107. Thus, the last completed set of images is selected for presentation to the subtraction logic 118.

In the subtraction logic 118 a subtraction of the primary mask (derived from the first memory unit 101 through the AND gate 113 and the OR gate 117) or of the secondary mask (derived from the second or third memory unit 102 or 103, respectively, the AND gate 114 or 115, respectively, the OR gate 116, and the other OR gate 117) takes place. The difference image signal formed in the subtraction logic 110 is fed into the display RAM 120 for display by the display device connected thereto.

For the sake of giving an example, but not for the purpose of limiting the scope of the invention, it should be mentioned that the following elements and components may be used in a control unit according to FIG. 6:

| Component | Type |
|---|---|
| Memory Units 101, 102, 103 and Display Ram 120 | 12 Bit × 128K Memory Module Siemens 820-823910 |

-continued

| Component | Type |
|---|---|
| Flip Flop 105, Primary/Secondary Flip Flop 106, Secondary Select Flip Flop 107 | SN7474N D-Type flip flop Texas Instruments |
| Analog-to-Digital Converter 108 | HAS 1202 A/D Converter Computer Labs |
| Counter 109 | SN74160N Synchronous 4-Bit Counter Texas Instruments |
| Comparator 110 | SN7485N 4-Bit magnitude Comparator Texas Instruments |
| Clear Mono. 111, Clear Mono 112 | SN74121N Monostable Multivibrator Texas Instruments |
| AND gates 113, 109a, 107a | SN7408N Quad 2-Input AND gate Texas Instruments |
| AND gates 115, 105a | SN74LS11N Triple 3-input AND gate Texas Instruments |
| AND gate 115 | SN74LS11N Triple 3-input AND gate Texas Instruments |
| OR gates 105b, 106a, 109b, 116, 117 | SN7432N Quad 2-input OR gate Texas Instruments |

While the forms of the medical imaging apparatus and method for furnishing difference images herein described constitute preferred embodiments of the invention, it is to be understood that the invention is not limited to these precise forms of assembly, and that a variety of changes may be made therein without departing from the scope of the invention.

What is claimed is:

1. A method for furnishing difference images from a video signal containing a sequence of images obtained from a patient under examination, comprising the steps of (a) recording a first of said images contained in said video signal in a first image storage means, thereby forming a primary mask;

(b) recording a subsequent second of said images contained in said video signal in a second image storage means;

(c) recording a subsequent third of said images contained in said video signal in a third image storage means;

(d) recording the images contained in said video signal following said third image, alternatingly in said second and said third image storage means;

(e) subtracting said primary mask from each of said second, third and further subsequent images contained in said video signal until provision of a signal for starting data acquisition;

(f) providing a signal for starting data acquisition;

(g) selecting from the second and third image storage means that stored image which has been most recently completed at the time of providing the data acquisition signal, as a secondary mask; and (h) subtracting said secondary mask from images contained in said video signal which appear after said data acquisition signal has been provided, thereby forming said difference images.

2. The method according to claim 1, further comprising the step of recording images contained in said video signal in a fourth image storage means after said data acquisition signal has been provided.

3. The method according to claim 1, wherein said secondary mask is the completed image stored in said second or third image storage means immediately prior to providing said data acquisition signal.

4. The method according to claim 1, wherein old images in said second and third image storage means are erased when new images are alternatingly recorded therein.

5. The method according to claim 1, wherein said second and third image storage means each contain a set of storage locations for storing a predetermined number of images, said method further comprising the steps of:
  (i) recording alternatingly a predetermined number of images in said two sets of storage locations; and
  (j) after each completion of a set, forming a summation of the recorded image data in that set, whereby the summation completed at the time of providing said data acquisition signal forms said secondary mask.

6. The method according to claim 1, wherein a predetermined number of images is summed up alternatingly in said second and third image storage means.

7. The method according to claim 1, further comprising the step of displaying said difference images on a display device.

8. The method according to claim 1, wherein said secondary mask is subtracted from live images of said video signal.

9. The method according to claim 1, wherein said secondary mask is subtracted from images contained in said video signal which is released from a fourth image storage device.

10. A medical apparatus for furnishing difference images, comprising in combination:
  (a) means for providing a video signal from a patient under examination, said video signal containing a sequence of consecutive images;
  (b) first image storage means for recording a first of said images, thereby forming a primary mask;
  (c) second image storage means;
  (d) third image storage means;
  (e) means, connected to said second and third image storage means, for feeding of subsequent images alternatingly into said second and third image storage means;
  (f) means for providing a signal for starting data acquisition;
  (g) subtracting means, connected to said first image storage means and said video signal providing means for subtracting said primary mask from images contained in said video signal until provision of said signal for starting data acquisition;
  (h) means, responsive to said data acquisition signal for selecting from said second and third storage means that stored image which had already been completed at the time of providing said data acquisition signal, as a secondary mask; and
  (i) subtracting means, connected to said secondary mask selecting means and said video signal providing means for subtracting said secondary mask from images contained in said video signal which follow said data acquisition signal, said subtracting means forming and issuing said difference images.

11. The apparatus according to claim 10, wherein said first, second and third image storage means each comprises means for summing up a predetermined number of images.

* * * * *